(12) United States Patent
Yokoo et al.

(10) Patent No.: US 6,999,505 B2
(45) Date of Patent: Feb. 14, 2006

(54) POWER LINE COMMUNICATION MODEM CAPABLE OF SIMULTANEOUSLY SUPPLYING POWER AND EXCHANGING DATA

(75) Inventors: Kenichi Yokoo, Fukushima-ken (JP); Akio Tadachi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/403,549

(22) Filed: Mar. 31, 2003

(65) Prior Publication Data

US 2003/0185027 A1    Oct. 2, 2003

(30) Foreign Application Priority Data

Apr. 1, 2002    (JP)    ............................. 2002-099291

(51) Int. Cl.
 H04B 1/38    (2006.01)
 H04M 11/04    (2006.01)
(52) U.S. Cl. ............ 375/222; 340/310.16; 340/310.18; 340/326; 455/402; 710/72; 363/146
(58) Field of Classification Search ................ 363/146, 363/125; 710/63, 64, 72; 713/300; 340/310.01, 340/310.08, 326, 310.16, 310.18, 656; 455/402; 375/222

See application file for complete search history.

(56) References Cited

U.S. PATENT DOCUMENTS

| 5,995,047 A | 11/1999 | Freyssinier et al. .. 343/700 MS |
| 6,054,906 A | 4/2000 | Kim ........................... 333/124 |
| 6,128,743 A * | 10/2000 | Rothenbaum ............... 713/300 |
| 6,445,087 B1 * | 9/2002 | Wang et al. .................. 307/40 |
| 6,697,892 B1 * | 2/2004 | Laity et al. .................... 710/72 |
| 6,747,859 B1 | 6/2004 | Walbeck et al. |
| 2003/0169157 A1 * | 9/2003 | Yokoo .................. 340/310.01 |

FOREIGN PATENT DOCUMENTS

| DE | 100 08 602 A 1 | | 6/2001 |
| DE | 10008602 A1 * | | 6/2001 |
| JP | 07-264107 | * | 10/1995 |
| JP | H07-264107 | | 10/1995 |

OTHER PUBLICATIONS

European Search Report dated Aug. 1, 2003 for EPO Patent Application No. EP 03 25 1966.

* cited by examiner

Primary Examiner—Jessica Han
(74) Attorney, Agent, or Firm—Brinks Hofer Gilson & Lione

(57) ABSTRACT

A power line communication MODEM includes a rectification circuit for converting an AC power source to a DC power source, a MODEM circuit to which a DC voltage is supplied from the rectification circuit, a USB connector connected to the MODEM circuit, and a signal overlapping circuit for overlapping a signal processed by the MODEM circuit with the AC power source, wherein the rectification circuit supplies the DC voltage to the USB connector.

2 Claims, 2 Drawing Sheets

POWER LINE COMMUNICATION MODEM CAPABLE OF SIMULTANEOUSLY SUPPLYING POWER AND EXCHANGING DATA

BACKGROUND OF THE INVENTION

1. Field of the Invention

This invention relates to a power line communication MODEM for transferring data from an information processing unit such as a personal computer through a power line.

2. Description of the Related Art

A power line communication MODEM (abbreviated as "PLC MODEM") is known as means that makes it possible to use a power line such as a distribution line for supplying power from a substation to each home and interior wiring extended in each home as a communication line. The PLC MODEM converts digital data from an information processing unit such as a personal computer to analog line data, overlaps the analog line data with a power line of a commercial power source, or converts the analog line data inputted through the power line to digital signals and transfers them to the information processing unit. Therefore, the PLC MODEM can constitute a communication network among information processing units.

FIG. 3 shows a PLC MODEM according to the prior art and a connection diagram when a communication network is constituted by use of the PLC MODEM. This PLC MODEM 40 includes a power source unit (AC adaptor) 41 having an attachment plug 41a with an AC cord fitted thereto, a MODEM main body unit 42 and a DC cord 43 for connecting the power source unit 41 to the MODEM main body unit 42. The power source unit 41 has a rectification circuit (not shown) for converting a commercial AC power source to a DC power source, and a DC voltage is supplied to the MODEM main body unit 42 through the cord 43.

The MODEM main body unit 42 has a rectangular parallelepiped shape, accommodates therein a MODEM circuit (not shown) and includes a connector of a USB standard (called "USB connector") 42a fitted to one of its side surfaces. The MODEM circuit converts the digital data inputted from the USB connector 42a to the analog line data and overlaps the analog line data with the DC voltage of the DC cord 43. The analog line data is further overlapped with the AC power source in the power source unit 41.

On the other hand, the DC power source is supplied from a power source unit (AC adaptor) 45 to an information processing unit 44 such as a notebook type personal computer. An AC cord 45a having an attachment plug and a DC cord 45b having a plug are connected to the power source unit 45. A USB connector (not shown) is fitted to the information processing unit 44, too. The USB connector 42a of the MODEM main body unit 42 and the USB connector of the information processing unit 44 are connected to each other through a USB cable 46.

In the construction described above, when the digital data is inputted from the information processing unit 44 to the MODEM main body unit 42, the MODEM circuit converts the digital data to the analog line data and overlaps the analog line data with the DC cord 43 for supplying the DC voltage. The analog line data is sent to the interior wiring through the attachment plug 41a. Therefore, data communication can be mutually made with other information processing unit inside the same home through the interior wiring. Mutual communication can also be made with other home through the distribution line.

The PLC MODEM and the information processing unit must always be used as a pair. Therefore, when no more spare plug sockets are available, a plug socket must be secured for the information processing unit used together with that for the PLC modem. Alternatively, another plug socket must be provided for branching the plug socket.

The information processing unit is connected to the PLC MODEM and at the same time, must be connected per se to the power source unit. Therefore, mutual connection gets complicated.

SUMMARY OF THE INVENTION

To eliminate the problem described above, the invention makes it possible to simultaneously accomplish the supply of the power source and the exchange of the data by supplying the AC power source to the PLC MODEM from one plug socket inside home and by merely connecting the PLC MODEM to the information processing unit.

To accomplish this object, the invention provides a power line communication MODEM including a rectification circuit for converting an AC power source to a DC power source, a MODEM circuit to which a DC voltage is supplied from the rectification circuit, a USB connector connected to the MODEM circuit, and a signal overlapping circuit for overlapping a signal processed by the MODEM circuit with the AC power source, wherein the DC voltage is supplied to the USB connector.

A case for accommodating the rectification circuit, the MODEM circuit and the signal overlapping circuit is provided, and the USB connector is fitted to the case.

DESCRIPTION OF THE PREFERRED EMBODIMENT

Figure 1:
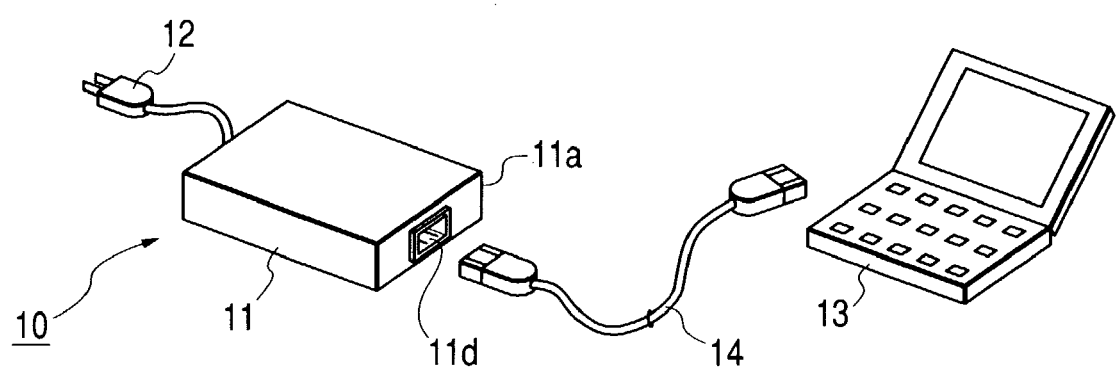
FIG. 1 is a structural view of a power line communication (PLC) MODEM according to the invention and a communication network using the PLC MODEM.
Figure 2:
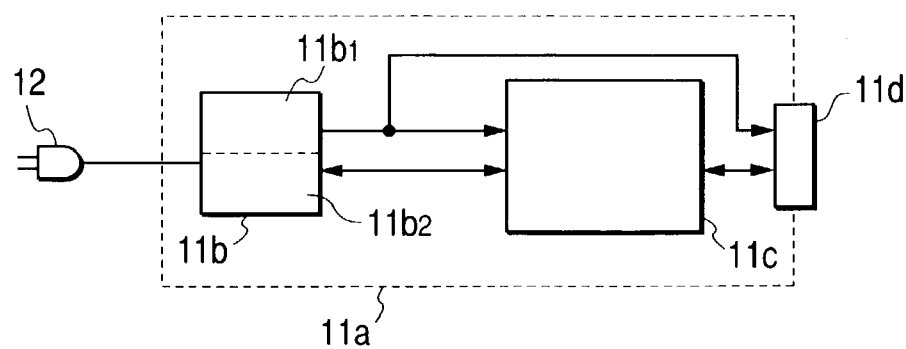
FIG. 2 is a structural circuit diagram of the PLC MODEM according to the invention.
Figure 3:
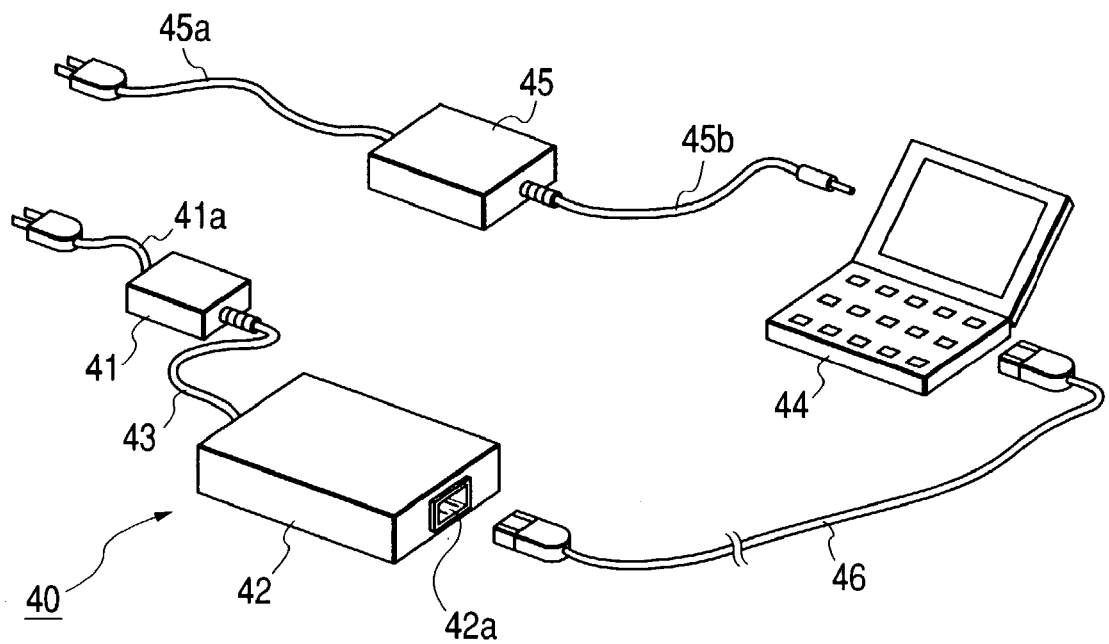
FIG. 3 is a structural view of a PLC MODEM according to the prior art and a communication network using the PLC MODEM.

FIG. 1 is a schematic view showing a PLC MODEM according to the invention and connection when a communication network is constituted by use of the PLC MODEM. FIG. 2 is a structural circuit diagram of the PLC MODEM according to the invention. Referring to FIGS. 1 and 2, the PLC MODEM 10 according to the invention includes a MODEM main body unit 11 and an AC cord 12 having an attachment plug for supplying AC power to the MODEM main body 11. A case 11a of the MODEM main body unit 11 accommodates a front-end 11b and a MODEM circuit 11c. The MODEM circuit 11c has a function of converting digital data from an information processing unit 13 as an external appliance such as a notebook type personal computer to analog line data and vice versa. A connector of a USB standard (called "USB connector") 11d for exchanging the digital data with the information processing unit 13 is fitted into the case 11a.

A rectification circuit 11b1 for converting an AC power source to a DC power source and a signal overlapping circuit 11b2 for overlapping the analog line data from the MODEM circuit 11c with the AC power source are constituted in the front-end 11b. The DC voltage from the rectification circuit 11b1 is supplied to the MODEM circuit 11c and to the USB connector 11d. The USB connector 11d is connected to the MODEM circuit 11c.

Here, when a communication network is constituted by use of the information processing unit 13, the attachment plug of the AC cord 12 is fitted into a plug socket inside home. A USB connector (not shown) fitted to the external information processing unit 13 and the USB connector 11d of the MODEM main body unit 11 are connected to each other through a USB cable 14.

In the construction described above, the DC voltage as the power source is supplied to the information processing unit 13 through the USB cable 14. The digital data outputted from the information processing unit 13 is inputted to the MODEM circuit 11c through the USB cable 14. The MODEM circuit 11c converts the digital data to the analog line data. The signal overlapping circuit 11b2 overlaps the analog line data with the AC power source (AC cord 12 having the attachment plug).

The analog line data inputted from outside through the AC power source is inputted to the MODEM circuit 11c through the signal overlapping circuit 11b2. The digital data converted by the MODEM circuit 11c is transferred to the information processing unit 13 through the USB connector 11d and through the USB cable 14. Therefore, mutual communication can be made inside the same home or with other home through interior wiring or a distribution line.

The information processing unit 13 may use a digital camera, a digital video apparatus, etc, besides the notebook type personal computer described above.

As explained above, the power line communication MODEM according to the invention includes the rectification circuit for converting the AC power source to the DC power source, the MODEM circuit to which the DC voltage from the rectification circuit is supplied, the USB connector connected to the MODEM circuit and the signal overlapping circuit for overlapping the signal processed by the MODEM signal with the AC power source, wherein the rectification circuit supplies the DC voltage to the USB connector. Therefore, when the AC power source is supplied from one plug socket inside home to the power line communication MODEM, the power source can be supplied to the external information processing unit through the USB cable connected to the USB connector, and the data can be exchanged with the information processing unit through the USB cable.

The PLC MODEM has the case for accommodating the rectification circuit, the MODEM circuit and the signal overlapping circuit and the USB connector is fitted to this case. Therefore, the construction of the power line communication MODEM can be simplified.

What is claimed is:

1. A power line communication MODEM for connecting to an AC power source, the AC power source having a power signal and a data signal comprising:

a power line having an AC plug connectable to the AC power source;

a rectification circuit that converts an AC power signal to a DC power signal;

a MODEM circuit connected to receive the data signal and process the data signal;

a signal overlapping circuit that overlaps the data signal processed by the MODEM circuit with the external AC power signal, the USB connector is connected to receive the data signal from the MODEM circuit and connected to the rectification circuit to receive the DC power signal, and the USB connector is connectable to an information processing unit to provide the data signal to the information processing unit and to provide power to the information processing unit.

2. The power line communication MODEM of claim 1, further comprising a case accommodating the rectification circuit, the MODEM circuit, and the signal overlapping circuit, and the USB connector is fitted to the case.

* * * * *